Patented Aug. 24, 1948

2,447,545

UNITED STATES PATENT OFFICE 2,447,545

SYNTHESIS OF TRYPTOPHANE AND INTERMEDIATES THEREFOR

Harold R. Snyder, Urbana, Ill., and Curtis W. Smith, Berkeley, Calif., assignors to Merck & Co., Inc., Rahway, N. J., a corporation of New Jersey No Drawing. Application October 21, 1944, Serial No. 559,837

21 Claims. (Cl. 260—319)

This invention relates generally to processes for producing dl-tryptophane, and particularly to a new process for preparing dl-tryptophane from substances not previously used as starting materials, and to new substances as intermediates in said process.

dl-Tryptophane has been heretofore prepared by condensation of indole-3-aldehyde with hydantoin or hippuric acid. It is now discovered according to the present invention that the synthesis of dl-tryptophane is effected by reacting quaternary substituted - 3 - aminomethyl-indole, for example, gramine methiodide, with acylamidomalonic esters.

Regarding in certain of its broader aspects, the novel process according to this invention comprises condensation of alkali metal-derivatives of monoacyl- and diacylamidomalonic esters with quaternary ammonium salts of 3-aminomethylindole, hydrolysis of the esters of $\alpha$-acylamido-$\alpha$-carboxy-$\beta$-(3-indole)-propionic acid to the dicarboxylic acids, conversion of the $\alpha$-acylamido-$\alpha$-carboxy-$\beta$-(3-indole)-propionic acid to the $\alpha$-acylamido-$\beta$-(3-indole)-propionic acid, and hydrolysis of the $\alpha$-acylamido-$\beta$-(3-indole)-propionic acid thus formed to dl-tryptophane. The reactions are indicated as follows:

Example I

About 6.9 g. of sodium is powdered in approximately 100 cc. of xylene and most of the xylene removed by decantation. To this powdered sodium is added about 500 cc. of dioxane (distilled from sodium) and about 68 g. of ethyl acetamidomalonate, and the mixture is maintained at about 92° C. for 14 hours with agitation. To the resulting light yellow suspension is added 101 g. of gramine methiodide and the mixture is stirred for about 19 hours at approximately 108° C. and then for about 3 hours at about 125° C. The resulting solution is cooled, causing precipitation of ethyl - $\alpha$ - acetamido-$\alpha$-carbethoxy-$\beta$-(3-indole)-propionate (M. P. 158° C.) which is removed by filtration and purified by conventional methods.

About 33.62 g. of the ester so prepared is heated under reflux with 19.2 g. of sodium hydroxide in 192 cc. of water for about 4 hours. The resulting solution is treated with activated carbon, filtered, cooled, and acidified with hydrochloric acid while retaining the temperature below 25° C. The resulting solution is retained thus cooled for about 4 hours causing the separation of $\alpha$-acetamido-$\alpha$-carboxy-$\beta$-(3-indole)-propionic acid (M. P. 144.5° C. with decomposition) which is removed

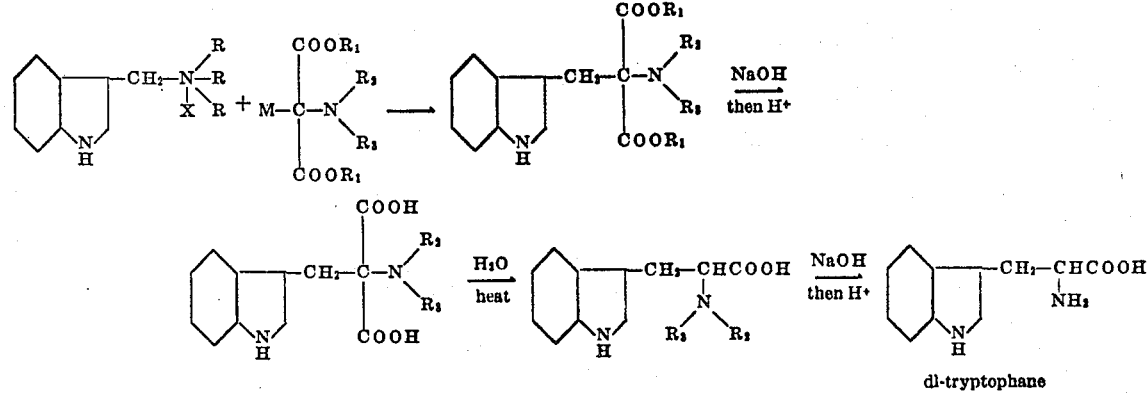

where R is alkyl, aryl, or aralkyl, $R_1$ is alkyl, aryl, or aralkyl, $R_2$ is hydrogen or acyl, $R_3$ is acyl, or $R_2$ and $R_3$ may be a dicarboxylic organic acid radical, X is halogen, and M is an alkali-forming metal.

The following examples illustrate methods of carrying out the present invention but it is to be understood that these examples are given by way of illustration and not of limitation.

by filtration and purified by recrystallization from aqueous methanol solution.

About 28 g. of the $\alpha$-acetamido-$\alpha$-carboxy-$\beta$-(3-indole)-propionic acid is heated under reflux with about 120 cc. of water for approximately 2½ hours. The N-acetyltryptophane (M. P. 206° C.) separates from the solution and can be recovered by filtration. However, in the production of dl-tryptophane it is not necessary to isolate the N-acetyltryptophane, and the hydrolysis of the acetyl group may be effected directly. After the decarboxylation is complete, about 16 g. of sodium hydroxide in 40 cc. of water is added, and the solution is refluxed for approximately 20 hours. The resulting alkaline solution is treated with activated carbon, filtered, acidified with about 24 g. of glacial acetic acid and cooled causing the separation of dl-tryptophane (M. P. 275–282° C. with decomposition) which is removed by filtration and purified by conventional methods.

*Example II*

18.3 g. of ethyl phthalimidomalonate is added to 1.15 g. of powdered sodium in 75 cc. of N-butyl-ether, and the mixture is heated with agitation at 120° C. for about 10 hours and then at 150° C. for about 4 hours. To this suspension is added about 17.4 g. of gramine methiodide and the mixture is heated with agitation at approximately 165° C. for about 18 hours. The hot butyl ether solution is then decanted from a red pasty mass and cooled causing precipitation of ethyl-α-phthalimido-α-carbethoxy-β-(3-indole) propionate (M. P. 177° C.) which is removed by filtration and purified by recrystallization from a mixture of benzene and ligroin.

About 2 g. of ethyl-α-phthalimido-α-carbethoxy-β-(3-indole) propionate is refluxed for about 5 hours with 1 g. of sodium hydroxide in 10 cc. of water. The resulting solution is treated with activated carbon, filtered, cooled, acidified with about 4 cc. of hydrochloric acid (conc.), and allowed to stand at about 5° C. for approximately 16 hours. The acidic solution is then decanted from the α-phthalimido-α-carboxy-β-(3-indole) propionic acid which separates as an oil, and the oil is refluxed for about 4 hours with 20 cc. of water. Then about 3 g. of sodium hydroxide is added and the solution is refluxed for about 22 hours. The resulting solution is treated with activated carbon, filtered, acidified with about 4.5 cc. of acetic acid (glacial) and cooled causing the separation of a mixture of phthalic acid and dl-tryptophane. The dl-tryptophane is separated from the phthalic acid by extraction of the precipitate with a solution of 5 cc. of hydrochloric acid (conc.) in 15 cc. of water. This extract is then made neutral with ammonium hydroxide solution, slightly acidified with a small amount of acetic acid, and cooled causing precipitation of the dl-tryptophane (M. P. 275° C. with decomposition) which is removed by filtration.

*Example III*

To a solution of about 19.32 g. of sodium in 1000 cc. of absolute ethanol is added about 196 g. of ethyl acetamidomalonate and the mixture refluxed for about ½ hour. To the resulting solution is added about 304 g. of gramine methiodide and the mixture refluxed for approximately 26 hours. The hot reaction mixture is then filtered, and the filtrate cooled causing precipitation of ethyl-α-acetamido-α-carbethoxy-β-(3-indole) propionate (M. P. 158–159° C.) which is recovered by filtration and purified by conventional operations.

The ethyl-α-acetamido-α-carbethoxy-β-(3-indole)-propionate thus obtained is subsequently treated in accordance with the process of Example I to recover dl-tryptophane.

*Example IV*

The process as described in Example I is repeated while maintaining a nitrogen atmosphere throughout the reactions. The yield is thereby increased.

*Example V*

The process as described in Example II is repeated while maintaining a nitrogen atmosphere throughout the reactions; and an increased yield of dl-tryptophane is obtained.

The examples illustrate the reaction of the methiodides of β-(dimethylaminomethyl)-indole (gramine methiodide) with alkali metal derivatives of ethyl acetamidomalonate and ethyl phthalimidomalonate. It is to be understood however that other quaternary substituted β-(aminomethyl)-indole compounds such as β-(diethylaminomethyl)-indole ethiodide, β(di-phenyl-aminomethyl)-indole methiodide, and β-(dibenzylaminomethyl)-indole methiodide and the like can be employed. In the condensation thereof with an alkali metal derivative of an acylamidomalonic ester, the amine by-product is removed as a gas if low boiling as in the case of trimethylamine or triethylamine; or if higher boiling, as in the case of diphenyl-N-methylamine or dibenzyl-N-methylamine, it is retained in the solvent and thus separated from the precipitated condensation product.

The process also proceeds in like manner when the alkali metal derivative of the monoacyl or diacylamino malonic ester contains other ester groups of other acyl radicals. Thus alkali metal derivatives of methyl acetamidomalonate, phenyl acetamidomalonate, benzyl acetamidomalonate and the like or corresponding esters of other monoacyl or diacyl amidomalonic acids such as formamidomalonic acid, benzamidomalonic acid, phthalimidomalonic acid and the like can be employed.

The condensation products thus formed are methyl, phenyl, or benzyl esters of α-acetamido-α-carboxy-β-(3-indole)-propionic acid, α-formamido-α-carboxy-β-(3-indole)-propionic acid, α-benzamido-α-carboxy-β-(3-indole)-propionic acid, and α-phthalimido-α-carboxy-β-(3-indole)-propionic acid. These intermediate compounds are converted to dl-tryptophane by deesterification, recarboxylation, and deacetylation in the manner previously described.

By the term "acylamido" as employed in the following claims is meant: an amido group of the class consisting of mono-acylamido and di-acylamido groups, including di-acylamido groups wherein the acyl substituents are linked by an alkyl or an aryl grouping. It is also to be understood that the esters referred to in the specification and claims are the di-esters.

Modifications may be made in carrying out the present invention without departing from the spirit and scope thereof and the invention is to be limited only by the appended claims.

What is claimed is:

1. The process that comprises reacting an indole compound having a β substituent of the formula

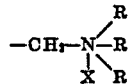

where R is selected from the class consisting of alkyl, aryl, and aralkyl groups, and X is a halogen, with a compound of the formula

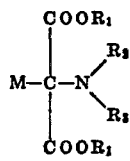

where $R_1$ is selected from the class consisting of alkyl, aryl, and aralkyl groups, $R_2$ is selected from the class consisting of hydrogen and acyl groups, $R_3$ is an acyl group, and M is an alkali metal, to form an indole compound having a β substituent of the formula

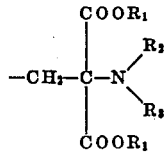

heating this compound in dilute aqueous alkali to hydrolyze the groups $R_1$ and acidifying to form the corresponding dicarboxylic acid, heating said dicarboxylic acid with water to form the corresponding monocarboxylic acid, deacylating said monocarboxylic acid by heating in aqueous alkali, and acidifying the resulting alkaline solution to precipitate dl-tryptophane.

2. The process that comprises reacting an indole compound having a β substituent of the formula

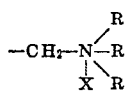

where R is selected from the class consisting of alkyl, aryl, and aralkyl groups, and X is halogen, with a compound of the formula

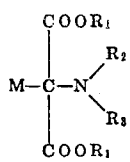

where $R_1$ is selected from the class consisting of alkyl, aryl, and aralkyl groups, $R_2$ is selected from the class consisting of hydrogen and acyl groups, $R_3$ is an acyl group, and M is an alkali metal to form an indole compound having a β substituent of the formula

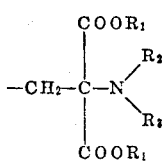

3. The process that comprises reacting an indole compound having a β substituent of the formula

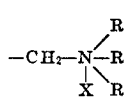

where R is selected from the class consisting of alkyl, aryl, and aralkyl groups, and X is halogen, with a compound of the formula

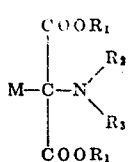

where $R_1$ is selected from the class consisting of alkyl, aryl, and aralkyl groups, $R_2$ is selected from the class consisting of hydrogen and acyl groups, $R_3$ is an acyl group, and M is an alkali metal, in a nitrogen atmosphere, to form an indole compound having a β substituent of the formula

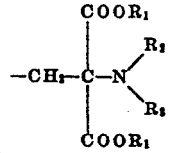

4. The process that comprises reacting an indole compound having a β substituent of the formula

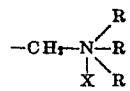

where R is selected from the class consisting of alkyl, aryl, and aralkyl groups, and X is halogen, with a compound of the formula

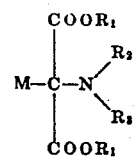

where $R_1$ is selected from the class consisting of alkyl, aryl, and aralkyl groups, $R_2$ is selected from the class consisting of hydrogen and acyl groups, $R_3$ is an acyl group, and M is an alkali metal, in the presence of a non-reactive organic liquid which is a solvent for the starting materials to form an indole compound having a β substituent of the formula

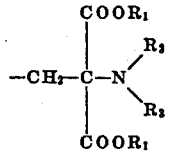

5. The process that comprises reacting an indole compound having a β substituent of the formula

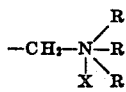

where R is selected from the class consisting of alkyl, aryl, and aralkyl groups, and X is halogen, with a compound of the formula

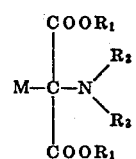

where $R_1$ is selected from the class consisting of alkyl, aryl, and aralkyl groups, $R_2$ is selected from the class consisting of hydrogen and acyl groups, $R_3$ is an acyl group, and M is an alkali metal, in the presence of a non-reactive organic liquid which is a solvent for the starting materials while maintaining a nitrogen atmosphere, to form an indole compound having a β substituent of the formula

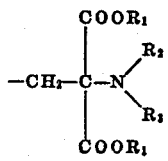

6. The process that comprises hydrolyzing an indole compound having a β substituent of the formula

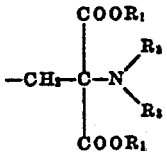

where $R_1$ is selected from the class consisting of alkyl, aryl, and aralkyl groups, $R_2$ is selected from the class consisting of hydrogen and acyl groups, and $R_3$ is an acyl group, to the corresponding dicarboxylic acid, heating said dicarboxylic acid with water to remove one carboxy group, heating the monocarboxylic acid thus obtained in aqueous alkali, and acidifying the resulting alkaline solution to precipitate dl-tryptophane.

7. The process that comprises hydrolyzing an indole compound having a β substituent of the formula

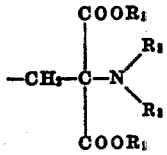

where $R_1$ is selected from the class consisting of alkyl, aryl, and aralkyl groups, $R_2$ is selected from the class consisting of hydrogen and acyl groups, and $R_3$ is an acyl group, to the corresponding dicarboxylic acid, heating said dicarboxylic acid with water to remove one carboxy group, heating the monocarboxylic acid thus obtained in aqueous alkali, acidifying the resulting alkaline solution to precipitate dl-tryptophane, and conducting said reactions in a nitrogen atmosphere.

8. The process that comprises heating an ester of an α-acylamido-α-carboxy-β-(3-indole)-propionic acid in dilute aqueous alkali and acidifying to form the corresponding dicarboxylic acid.

9. The process that comprises heating an α-acylamido-α-carboxy-β-(3-indole)-propionic acid in water to form the corresponding α-acylamido-β-(3-indole)-propionic acid.

10. The process that comprises heating an α-acylamido-β-(3-indole)-propionic acid in aqueous alkali, and acidifying the resulting alkaline solution to precipitate dl-tryptophane.

11. The process that comprises reacting the methiodide of 3-dimethylaminomethyl-indole with the sodium derivative of ethyl acetamidomalonate to form ethyl α-acetamido-α-carbethoxy-β-(3-indole)-propionate.

12. The process that comprises reacting the methiodide of 3-dimethylaminomethyl-indole with the sodium derivative of ethyl acetamidomalonate to form ethyl α-acetamido-α-carbethoxy-β-(3-indole)-propionate, heating this substance in dilute aqueous alkali and acidifying to form α-acetamido-α-carboxy-β-(3-indole)-propionic acid, heating the latter in water to produce dl-N-acetyltryptophane, and heating the same in aqueous alkali, and acidifying the resulting alkaline solution to precipitate dl-tryptophane.

13. The process that comprises heating ethyl α-acetamido-α-carbethoxy-β-(3-indole)-propionate in dilute aqueous alkali and acidifying to form α-acetamido-α-carboxy-β-(3-indole)-propionic acid, decarboxylating the latter by heating in water, heating the dl-N-acetyltryptophane thus formed with aqueous alkali and acidifying the resulting alkaline solution to precipitate dl-tryptophane.

14. The process that comprises reacting the methiodide of 3-dimethylaminomethyl-indole with the sodium derivative of ethyl phthalimidomalonate to form ethyl-α-phthalimido-α-carbethoxy-β-(3-indole)-propionate, heating this substance in dilute aqueous alkali and acidifying to form α-phthalimido-α-carboxy-β-(3-indole)-propionic acid, heating the latter in water to produce N-phthalimidotryptophane, and heating the same in aqueous alkali, and acidifying the resulting alkaline solution to precipitate dl-tryptophane.

15. The process that comprises heating ethyl α-phthalimido-α-carbethoxy-β-(3-indole)-propionate in dilute aqueous alkali and acidifying to form α-phthalimido-α-carboxy-β-(3-indole)-propionic acid, decarboxylating the latter by heating in water, heating the N-phthalimidotryptophane thus formed with aqueous alkali and acidifying the resulting alkaline solution to precipitate dl-tryptophane.

16. A compound selected from the class consisting of α-acylamido-α-carboxy-β-(3-indole)-propionic acids and esters thereof.
dole)-propionic acids.

17. Esters of α-acylamido-α-carboxy-β-(3-indole)-propionic acids.

18. α-Acylamido-α-carboxy-β-(3-indole)-propionic acids.

19. Ethyl α-acetamido-α-carbethoxy-β-(3-indole)-propionate.

20. α-Acetamido-α-carboxy-β-(3-indole)-propionic acid.

21. α-Phthalimido-α-carboxy-β-(3-indole)-propionic acid.

HAROLD R. SNYDER.
CURTIS W. SMITH.

REFERENCES CITED

The following references are of record in the file of this patent:

Albertson et al.: J. Am. Chem. Soc. (1944), vol. 66, page 500.